US009922022B2

(12) United States Patent
Masson et al.

(10) Patent No.: US 9,922,022 B2
(45) Date of Patent: Mar. 20, 2018

(54) AUTOMATIC TEMPLATE GENERATION BASED ON PREVIOUS DOCUMENTS

(71) Applicant: Microsoft Technology Licensing, LLC., Redmond, WA (US)

(72) Inventors: James Squires Masson, Seattle, WA (US); Shikha Devesh Desai, Bellevue, WA (US); Theresa Ann Estrada, Redmond, WA (US); Michelle Elena Keslin, Kirkland, WA (US); Yu Been Lee, Bellevue, WA (US); Allison Anne Whilden, Kirkland, WA (US); Enrique J. Dominguez, Seattle, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 0 days.

(21) Appl. No.: 15/191,456

(22) Filed: Jun. 23, 2016

(65) Prior Publication Data

US 2017/0220544 A1    Aug. 3, 2017

Related U.S. Application Data

(60) Provisional application No. 62/289,509, filed on Feb. 1, 2016.

(51) Int. Cl.
*G06F 17/00* (2006.01)
*G06F 17/24* (2006.01)
(Continued)

(52) U.S. Cl.
CPC ........ *G06F 17/248* (2013.01); *G06F 3/04842* (2013.01); *G06F 17/30011* (2013.01);
(Continued)

(58) Field of Classification Search
CPC ................................. G06F 17/30705
See application file for complete search history.

(56) References Cited

U.S. PATENT DOCUMENTS 4,139,901 A * 2/1979 Ganske ............... G06F 3/153
6,189,002 B1 * 2/2001 Roitblat ............. G06F 17/3061
(Continued)

FOREIGN PATENT DOCUMENTS

| EP | 1748365 | 1/2007 |
|----|---------|--------|
| JP | 2005209071 A | 8/2005 |
| JP | 2009271844 A | 11/2009 |

OTHER PUBLICATIONS

"DocumentFormat.OpenXml.Wordprocessing namespace", Retrieved on: Aug. 19, 2016Available at: https://msdn.microsoft.com/en-us/library/documentformat.openxml.wordprocessing(v=office.15).aspx, 47 pgs.

(Continued)

*Primary Examiner* — Laurie Ries
(74) *Attorney, Agent, or Firm* — Merchant & Gould P.C.

(57) ABSTRACT

Automatic generation of a document template based on recognized composition element patterns in documents associated with a user is provided. Composition elements used in documents are typically unique to a particular user or to a group of users. An automated template generation system detects composition element patterns in documents associated with the user, and generates and provides one or more useful and relevant templates comprising composition elements consistent with subsets of composition elements used in previously created documents. Generating a document template based on composition element patterns in documents associated with the user improves the user experience, reduces the use of bandwidth, memory, and processing power to reuse composition elements between docu- (Continued)

ments. Additionally, providing user-relevant templates helps to ensure consistency across documents created by the user.

20 Claims, 12 Drawing Sheets

(51) Int. Cl.
  *G06F 17/30* (2006.01)
  *G06F 3/0484* (2013.01)
(52) U.S. Cl.
  CPC .. *G06F 17/30336* (2013.01); *G06F 17/30705* (2013.01); *G06F 17/30864* (2013.01)

(56) References Cited

U.S. PATENT DOCUMENTS

| | | | | |
|---|---|---|---|---|
| 6,351,755 | B1* | 2/2002 | Najork | G06F 17/30864 |
| | | | | 707/E17.108 |
| 7,127,670 | B2* | 10/2006 | Bendik | G06F 17/248 |
| | | | | 707/999.001 |
| 7,149,347 | B1* | 12/2006 | Wnek | G06K 9/00469 |
| | | | | 382/159 |
| 7,225,401 | B2* | 5/2007 | Purvis | G06F 17/243 |
| | | | | 707/999.001 |
| 7,836,012 | B1* | 11/2010 | Nevill-Manning | G06F 17/2211 |
| | | | | 707/602 |
| 7,844,896 | B2* | 11/2010 | Ohashi | G06T 11/206 |
| | | | | 715/243 |
| 7,966,204 | B1* | 6/2011 | Hail | G06Q 40/00 |
| | | | | 705/2 |
| 8,154,774 | B2* | 4/2012 | Shinkawa | G03B 27/50 |
| | | | | 358/474 |
| 8,176,412 | B2* | 5/2012 | Bhandar | G06F 17/211 |
| | | | | 715/235 |
| 8,255,397 | B2* | 8/2012 | Gollapudi | G06F 17/3071 |
| | | | | 707/736 |
| 8,356,045 | B2* | 1/2013 | Chang | G06F 17/30011 |
| | | | | 707/737 |
| 8,719,699 | B2* | 5/2014 | O'Brien | G06F 17/248 |
| | | | | 715/234 |
| 9,141,691 | B2* | 9/2015 | Goerke | G06F 17/30705 |
| 9,235,758 | B1* | 1/2016 | Agrawal | G06T 7/11 |
| 9,330,065 | B2* | 5/2016 | Damera-Venkata | G06F 17/211 |
| 2001/0042083 | A1* | 11/2001 | Saito | G06F 17/30253 |
| | | | | 715/202 |
| 2003/0182268 | A1* | 9/2003 | Lal | G06F 17/30917 |
| 2004/0102958 | A1* | 5/2004 | Anderson, IV | G06F 17/2775 |
| | | | | 704/4 |
| 2004/0163048 | A1* | 8/2004 | McKnight | G06F 17/211 |
| | | | | 715/249 |
| 2005/0055635 | A1* | 3/2005 | Bargeron | G06F 17/248 |
| | | | | 715/251 |
| 2005/0154701 | A1* | 7/2005 | Parunak | G06F 17/30734 |
| 2005/0154779 | A1* | 7/2005 | Cypher | G06F 17/248 |
| | | | | 709/202 |
| 2005/0162677 | A1* | 7/2005 | Toumanova | G06F 3/1204 |
| | | | | 358/1.13 |
| 2006/0080329 | A1* | 4/2006 | Skibo | G06F 17/248 |
| 2006/0080361 | A1* | 4/2006 | Suzuki | G06F 17/2229 |
| 2006/0224952 | A1* | 10/2006 | Lin | G06F 17/2247 |
| | | | | 715/209 |
| 2007/0028166 | A1* | 2/2007 | Hundhausen | G06F 17/212 |
| | | | | 715/205 |
| 2007/0079236 | A1* | 4/2007 | Schrier | G06F 17/217 |
| | | | | 715/206 |
| 2008/0072140 | A1* | 3/2008 | Vydiswaran | G06F 17/2211 |
| | | | | 715/243 |
| 2008/0104504 | A1* | 5/2008 | Gimson | G06F 17/248 |
| | | | | 715/234 |
| 2008/0109248 | A1* | 5/2008 | Dietz | G06Q 30/018 |
| | | | | 705/1.1 |
| 2008/0209313 | A1* | 8/2008 | Gonser | G06F 17/248 |
| | | | | 715/255 |
| 2008/0288861 | A1* | 11/2008 | Jones | G06F 17/212 |
| | | | | 715/253 |
| 2010/0167311 | A1* | 7/2010 | Canters | C12Q 1/005 |
| | | | | 435/7.4 |
| 2010/0191748 | A1* | 7/2010 | Martin | G06F 17/30675 |
| | | | | 707/750 |
| 2010/0254604 | A1* | 10/2010 | Prabhakara | G06K 9/00469 |
| | | | | 382/173 |
| 2010/0313119 | A1* | 12/2010 | Baldwin | G06F 17/248 |
| | | | | 715/256 |
| 2011/0238664 | A1* | 9/2011 | Pedersen | G06F 17/30011 |
| | | | | 707/737 |
| 2011/0258535 | A1* | 10/2011 | Adler, III | G06F 17/214 |
| | | | | 715/235 |
| 2011/0264711 | A1* | 10/2011 | Thang | G06F 8/34 |
| | | | | 707/812 |
| 2011/0296298 | A1* | 12/2011 | Ahuja | G06F 17/30893 |
| | | | | 715/248 |
| 2012/0191716 | A1* | 7/2012 | Omoigui | H01L 27/1463 |
| | | | | 707/740 |
| 2012/0278341 | A1* | 11/2012 | Ogilvy | G06F 17/30616 |
| | | | | 707/749 |
| 2012/0303697 | A1* | 11/2012 | Alstad | G06F 17/3089 |
| | | | | 709/203 |
| 2013/0080886 | A1* | 3/2013 | Anderson | G06F 17/2775 |
| | | | | 715/256 |
| 2013/0097168 | A1* | 4/2013 | Chang | G06F 17/30707 |
| | | | | 707/737 |
| 2013/0246231 | A1* | 9/2013 | Weekley | G06Q 10/0875 |
| | | | | 705/30 |
| 2014/0019851 | A1* | 1/2014 | Deroller | G06F 17/248 |
| | | | | 715/243 |
| 2014/0188574 | A1* | 7/2014 | Luca | G09B 7/00 |
| | | | | 705/7.39 |
| 2014/0281930 | A1* | 9/2014 | Liu | G09B 3/04 |
| | | | | 715/243 |
| 2014/0344952 | A1* | 11/2014 | Kulick | G06F 21/6245 |
| | | | | 726/28 |
| 2015/0019589 | A1* | 1/2015 | Arroyo | G06F 17/30424 |
| | | | | 707/779 |
| 2015/0161261 | A1* | 6/2015 | Griddaluru | G06F 17/30696 |
| | | | | 707/707 |
| 2016/0098405 | A1* | 4/2016 | Gorbansky | G06F 17/3033 |
| | | | | 707/749 |

OTHER PUBLICATIONS

Mather, Paul M., "Computer Processing of Remotely-Sensed Images: An Introduction", In Publication of John Wiley & Sons, Jun. 25, 2004, 5 pgs.

PCT International Search Report and Written Opinion in International Application PCT/US2017/015536, dated May 11, 2017, 12 pages.

PCT International Search Report and Written Opinion in International Application PCT/US2017/016060, dated May 8, 2017, 17 pgs.

Thenmalar, S., et al., "Automatic Generation of Templates using Ontology", In Proceedings of Third International Symposium on Women in Computing and Informatics, Aug. 10-13, 2015, pp. 668-672.

* cited by examiner

AUTOMATIC TEMPLATE GENERATION BASED ON PREVIOUS DOCUMENTS

CROSS-REFERENCE TO RELATED APPLICATIONS

The application claims priority to U.S. Provisional Patent Application No. 62/289,509 titled "Automatic Template Generation Based on Previous Documents" filed Feb. 1, 2016, the disclosure of which is hereby incorporated by reference in its entirety.

BACKGROUND

Users oftentimes create documents that have a similar general structure, such as documents with recurring content and/or like formatting. Generally, the structure is unique to a particular user or to a group of users. For example, a user may be a college student whose professors have requirements around the formatting of work for their classes. For each new assignment, the user may start out by fine tuning the formatting to match the particular class's requirements. The user may either start with a blank document and set up the formatting, or use a previous assignment as a template in an attempt to have consistent formatting.

Or, as another example, a user may produce legal documents that have a specific structure and may include boilerplate language that is shared between documents. When creating a new document, the user may cut and paste portions of an existing document into the new document. As can be appreciated, setting up each new document with individual attributes or manually assembling documents from existing documents can be tedious, time consuming, and can be prone to human error. Additionally, additional processing steps are required by a computing device to format each new document according to a user's input.

A template is pre-constructed document type that includes various composition elements, such as a collection of styles, formatting settings, and content. When opened in an application, a template creates a copy of itself, into which users can input their own information in lieu of repeatedly creating a new document with the various composition elements. An assortment of pre-constructed templates may be preinstalled with an application, or may be available for download. In some applications, users are enabled to create and save custom templates, which can be used for authoring future documents.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

To improve efficiency of computing devices and improve the user experience thereon when creating documents, the systems, methods, and computer storage media disclosed herein provide generation of a document template based on recognized recurring composition elements. An automated template generation method and system detects composition element patterns in documents associated with the user, and generates and provides the user with one or more useful and relevant templates comprising composition elements consistent with subsets of composition elements used in previously created documents.

Examples are implemented as a computer process, a computing system, or as an article of manufacture such as a device, computer program product, or computer readable medium. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
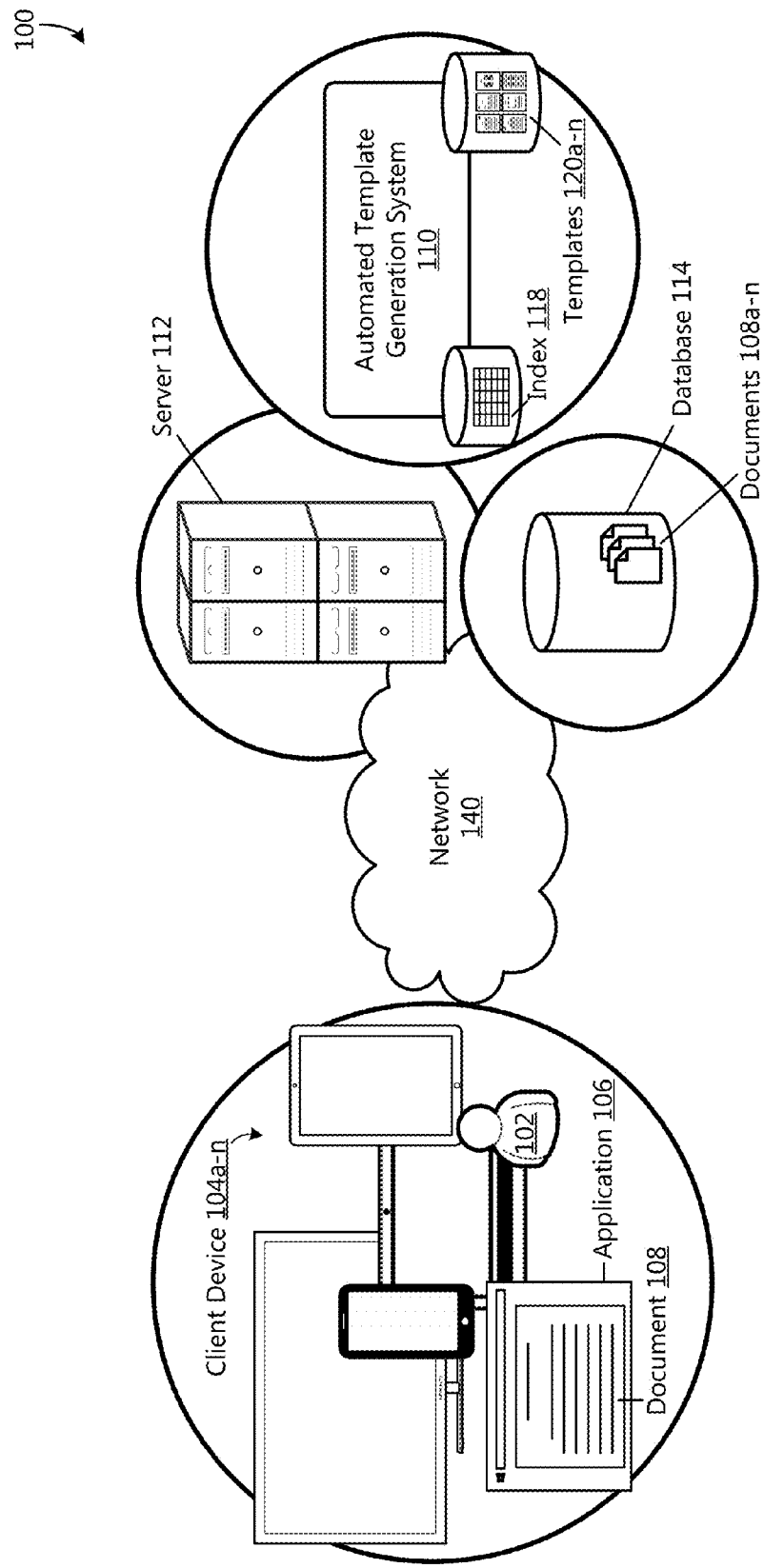
FIG. 1 is an illustration of an example authoring environment in which automated document template generation based on recognized recurring composition elements may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage medium for automated document template generation based on recognized recurring composition elements. FIG. 1 is a block diagram illustrating an example authoring environment 100 in which automated document template generation based on recognized recurring composition elements may be practiced. The example authoring environment 100 includes at least one client computing device 104a-n (collectively, 104), utilized by a user 102, in the form of a desktop computer, laptop computer, tablet computer, handheld computing device, mobile communication device, wearable device, gaming device, and the like.

The example authoring environment 100 includes at least one application 106 executing on the computing device 104. The application 106 may be one of various types of applications or a suite of applications, such as, but not limited to, a word processing application, a spreadsheet application, a slide presentation application, a drawing or computer-aided drafting application, an electronic mail and contacts application, a notes application, and the like. In some examples, the application 106 is a thick client application stored locally on the computing device 104. In other examples, the application is a thin client application 106 (i.e., web application) residing on a remote server (e.g., web application server) accessible over a network 140, such as the Internet, an intranet, a local area network, a wide area network, or combinations thereof. A thin client application 106 may be hosted in a browser-controlled environment or coded in a browser-supported language and reliant on a user agent, such as a common web browser, to render the application 106 executable on the computing device 104.

Further, the application 106 is operative to receive input data including at least a portion of a document 108. The application 106 is also configured to communicate with an automated template generation system 110, illustrative of a software module or system optimized to automatically recognize recurring composition elements in a plurality of stored documents 108a-n associated with the user 102 and to generate and provide one or more document templates 120a-n (collectively, 120) for the user 102 based on recognized recurring composition elements.

Composition elements used in documents 108 are typically unique to a particular user 102 or to a group of users, such as colleagues, students of a same class, etc. For example, typically a user 102 or a group of users create documents 108 that have same or similar composition elements, such as document level formatting (e.g., page layout), text formatting, and portions of content. Accordingly, the automated template generation system 110 is able to detect composition element patterns in documents 108 associated with a user 102 for providing the user 102 a template 120 comprising subsets of composition elements useful to the user 102. Generating a document template 120 based on composition element patterns in documents 108 associated with the user 102 improves the user experience, reduces the use of bandwidth, memory, and processing power to reuse composition elements between documents 108. For example, in lieu of repeatedly creating a new document 108 with the various composition elements preferred or required by the user 102, or in lieu of manually creating a desired template, the automated template generation system 110 automatically provides the user 102 with one or more document templates 120 that are relevant to the user 102. Additionally, providing user-relevant templates 120 helps to ensure consistency across documents 108 created by the user 102. As can be appreciated, providing templates customized specifically to a user's needs reduces rework time; a user is enabled to save time and steps in creating documents 108 from scratch or in reworking existing documents 108, thus reducing the amount of user input and the computing device 104 processing power needed to process the user input.

In some examples, the automated template generation system 110 runs on a server 112. The server 112 is in communication with a database 114 that stores documents 108 from which the automated template generation system 110 builds an index 118 of content blocks from which composition elements are analyzed for identifying recurrence and other trends for automatically creating one or more document templates 120. For example, when a document 108 is authored in a cloud computing environment, such as via a web interface or thin client, the automated template generation system 110 builds an index 118 of content blocks and formatting properties from documents 108 located in the cloud (e.g., stored in a database 114 or memory storage device managed by the server 112), documents 108 located locally to the user (e.g., stored in a database 114 or memory storage device managed by the computing device 104), and documents 108 located on devices part of a local or enterprise network in communication with the computing device 104 (e.g., stored in a database 114 or memory storage device managed by a different computing device 104 or a local or enterprise server, such as a document management system).

The server 112 may be located remotely from the local network of the computing device 104, for example, as a cloud server, in which case the network 140 represents the Internet or a Virtual Private Network (VPN) or other direct data link. The server 112 may also be located as part of the local network of the computing device 104, in which case the network 140 represents a Local Area Network (LAN) or private distributed network for an entity (e.g., a company, a university, a government agency). The automated template generation system 110 is provided by the server 112 to authorized users and receives communications over the network 140 to build the index 118 and create and provide document templates 120 relevant to those authorized users 102.

Figure 2:
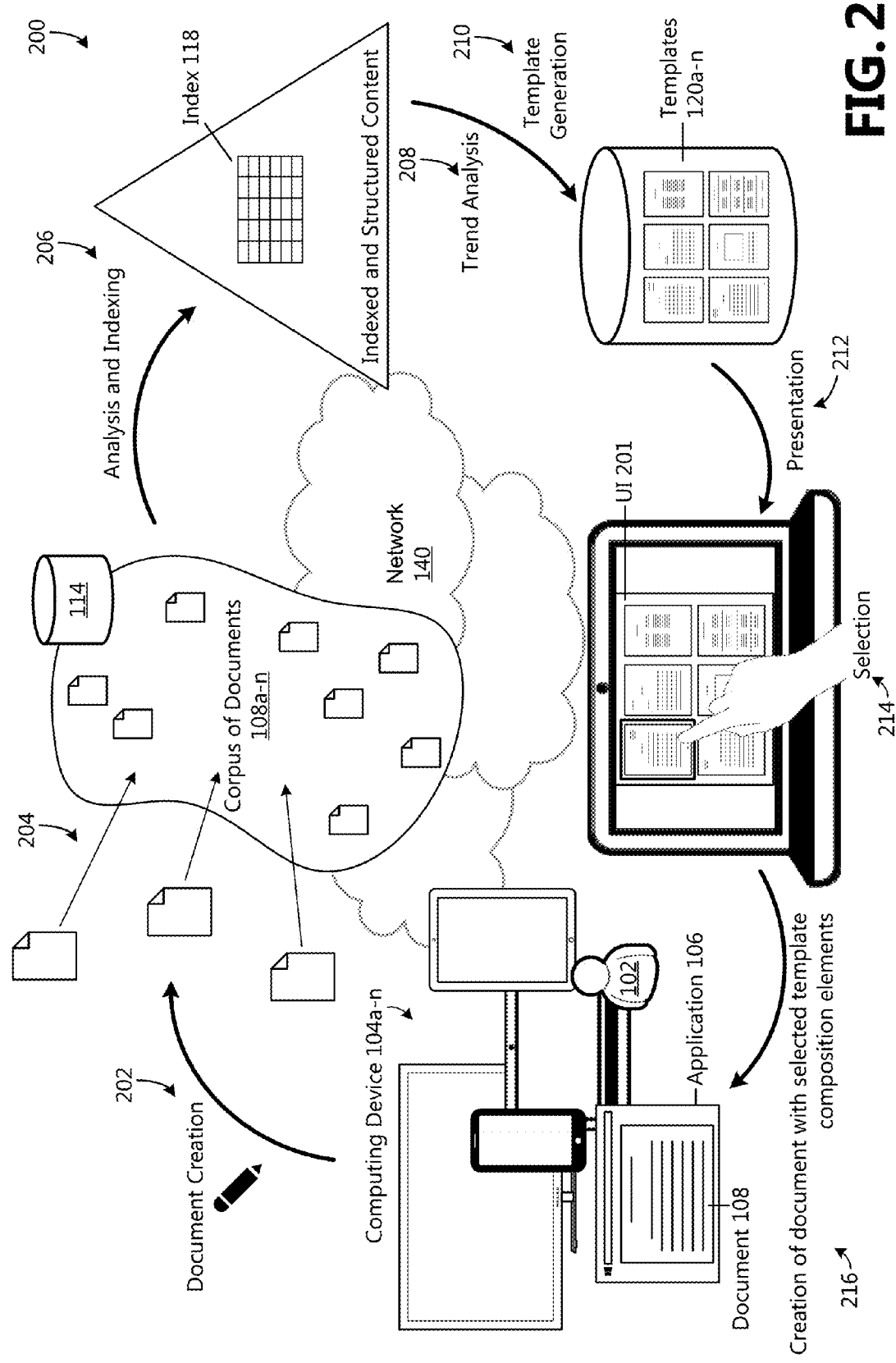
FIG. 2 is a graphical representation of a flow of data in an example method for automated document template generation based on recognized recurring composition elements.

With reference now to FIG. 2, a graphical representation of a flow of data 200 in an example method for automated generation of a document template 120 based on recognized recurring composition elements in an example authoring environment is illustrated. The example flow of data 200 begins at 202, where the computing device 104 receives input from the user 102 for creating a document 108. For example, the user 102 may interact with and modify content and formatting elements by adding, removing, repositioning, or otherwise modifying content or formatting properties of the document 108. Content or formatting properties may be added, removed, or modified via various input methods, such as those relying on mice, keyboards, and remote controls, as well as Natural User Interface (NUI) methods, which enable a user to interact with a device in a "natural" manner, such as via speech recognition, touch and stylus recognition, gesture recognition both on screen and adjacent to the screen, air gestures, head and eye tracking, voice and speech, vision, touch, hover, gestures, and machine intelligence.

The example flow of data 200 continues to 204, where the document 108 is stored in the database 114. In some examples, the database 114 is located locally to the user (e.g., a database 114 or memory storage device managed by a computing device 104). In other examples, the database 114 is located on devices that are part of a local or enterprise network in communication with the computing device 104 (e.g., a database 114 or memory storage device managed by a different computing device 104 or a local or enterprise server, such as a document management system). In yet other examples, the database 114 is located in the cloud (e.g., a database 114 or memory storage device managed by a server 112). As will be appreciated, the server 112 and the database 114 may be part of a distributed system, and composed of a multitude of individual computing systems, and multiple client devices 104 may be in communication with the automated template generation system 110 for automated document template 120 generation based on recognized recurring composition elements.

The example flow of data 200 continues to 206, where the automated template generation system 110 intelligently scans a corpus of documents 108 associated with the user 102, and recognizes trends and patterns of composition elements of the corpus of documents 108. According to aspects, the corpus of documents 108 is stored in the database 114. In some examples, the user 102 or the automated template generation system 110 may designate databases 114 or portions of databases 114 from which documents 108 may be drawn, and may also designate specific documents. For example, a user 102 or the automated template generation system 110 may designate an associated online storage service, such as ONEDRIVE® cloud storage solution available from MICROSOFT CORPORATION of Redmond, Wash., as the database 114. The user 102 or the automated template generation system 110 may also designate a hard drive, folder, or file local to the computing device 104 or connected to the network 140 as the database 114.

The user 102 or the automated template generation system 110 may also designate cloud or local storage associated with the user 102 or a colleague of the user 102 as the database 114. For example, the automated template generation system 110 may utilize a search and discovery service, such as the DELVE™ management tool, also available from MICROSOFT CORPORATION of Redmond, Wash., to discover connections between persons in an organization and locate files, folders, and drives of colleagues of the user 102 to analyze for identifying recurrence and other trends for automatically creating one or more document templates 120.

According to various aspects, the automated template generation system 110 is operative to intelligently scan the corpus of documents 108, and index the document content, content formatting, and document level formatting. For example, the automated template generation system 110 builds an index 118 of content blocks, formatting properties, and page layout properties. In some examples, the automated template generation system 110 reads markup language tags, such as Extensible Markup Language (XML) tags to distinguish a position or a level (e.g., heading, header, body, footer, footnote, endnote) associated with content within the document 108.

The example flow of data 200 continues to 208, where the automated template generation system 110 analyzes the index 118 for identifying trends in document content or in formatting properties. In some examples, the automated template generation system 110 applies structural, statistical, and linguistic techniques to discern types of content and relationships between content and the structure of the documents 108. According to an aspect, the automated template generation system 110 identifies subsets of composition elements in documents 108. For example, several documents 108 may have consistently formatted headings, consistent pieces of content, but inconsistently formatted page numbering. The automated template generation system 110 is operative to identify the consistent composition trends (e.g., formatting of headings, pieces of content). In some examples, the automated template generation system 110 analyzes and compares other information associated with the documents 108 with identified matching composition elements to prioritize subsets of identified composition elements. For example, the other information may include an age factor based on the age of the document(s) 108, or a relevancy factor based on the relationship of the author to the user 102 (e.g., when analyzing documents 108 of a user's colleagues).

Figure 3:
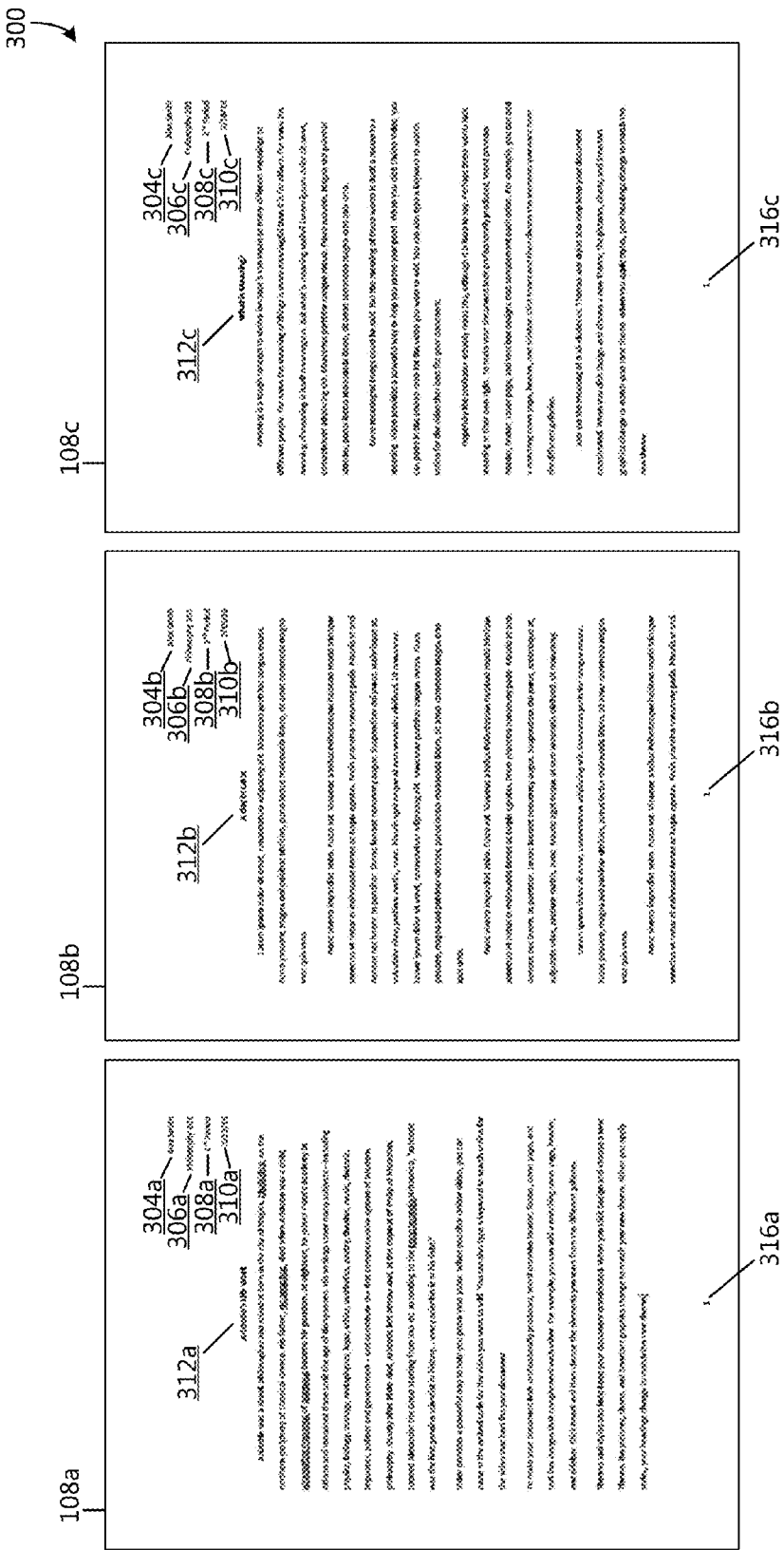
FIG. 3 is an illustration showing example documents from which the automated template generation system recognizes recurring composition elements for generating a document template.

As an example and with reference to FIG. 3, a particular user 102, Alex Smith, is student whose coursework includes writing numerous papers (i.e., documents 108a-c). Each of his teachers may have different requirements around the formatting of work. For example and as illustrated in FIG. 3, a teacher of a first class, Philosophy 201, may require his/her students to include a right-justified heading on assignments including the student's name 304, the class 306, the class period 308, and the date 310. The teacher may also require for each paper to be double-spaced, left-justified, and have one-inch margins, include a title 312 centered and in bold lettering, and to include page numbers 316 centered and at the bottom of the page. Teachers of other classes may have different requirements.

For the first couple of papers (i.e., documents 108) Alex (i.e., user 102) writes for his classes, he may start out creating each new paper (i.e., document 108) by adjusting the formatting to match the particular class's requirements. Alex (i.e., user 102) may also use certain formatting properties and styles that he personally prefers to use, such as a certain typeface. As Alex (i.e., user 102) creates papers (i.e., documents 108), and as the papers are stored in the database 114, the automated template generation system 110 scans and indexes the contents and formatting properties of the papers (i.e., documents 108). The automated template generation system 110 then performs an analysis of the index 118, and identifies matching subsets of composition elements between the documents 108.

With reference still to the illustrated example 300 in FIG. 3, the automated template generation system 110 identifies that three documents 108a,b,c authored by Alex (i.e., user 102) include matching portions of content. For example, the automated template generation system 110 identifies the same text "Alex Smith" (i.e., name 304a,b,c) on a first line of the three documents 108a,b,c, the same text "Philosophy 201" (i.e., class 306a,b,c) on a second line of the three documents 108a,b,c, and the same text "3$^{rd}$ Period" (i.e., class period 308a,b,c) on a third line of the three documents 108a,b,c. The automated template generation system 110 further identifies a <date> tag (i.e., date 310a,b,c) on a fourth line of the three documents 108a,b,c. The <date> tag may be inserted by the user 102, may be automatically inserted by the application 106 used to author the document(s) 108 upon understanding that the type of data the user is entering is a date 310, or may be identified and automatically inserted by the automated template generation system 110 while indexing or analyzing. The automated template generation system 110 further identifies the same formatting properties (e.g., right justification, double spacing) associated with the matching content in the three documents 108a,b,c.

Continuing with the example, the automated template generation system 110 identifies that the three documents 108a,b,c authored by Alex (i.e., user 102) further include additional matching composition elements. For example, the automated template generation system 110 identifies a title heading 312a,b,c in the three documents 108a,b,c that includes varying textual content, but that have a same formatting style (e.g., centered, bold, 12 pt font). The automated template generation system 110 further identifies additional matching composition elements, such as page layout, alignment, spacing, margins, indentions, page numbering, typeface, etc.

With reference again to FIG. 2, when a set of matching composition elements across a plurality of documents 108 is recognized, the example flow of data 200 continues to 210, where the automated template generation system 110 generates one or more document templates 120 based on the recognized composition element set. According to examples, a template 120 is a pre-constructed file that includes various composition elements, such as a collection of styles, formatting settings, document level formatting settings, and content on which a new document 108 can be based. According to an example, the automated template generation system 110 is operative to build a template 120 using XML tags to give the content or formatting elements in the recognized set of matching composition elements various structural and relationship meanings according to a schema. The automated template generation system 110 is operative to distinguish the content or formatting elements included in the document template 120 and the positions or levels (e.g., heading, header, body, footer, footnote, endnote) associated with content or formatting elements within the document template 120 according to the documents 108 from which the composition elements were identified.

Figure 4A:
FIG. 4A is an illustration showing a user interface for displaying an automatically generated document template on an example computing device.
Figure 4B:
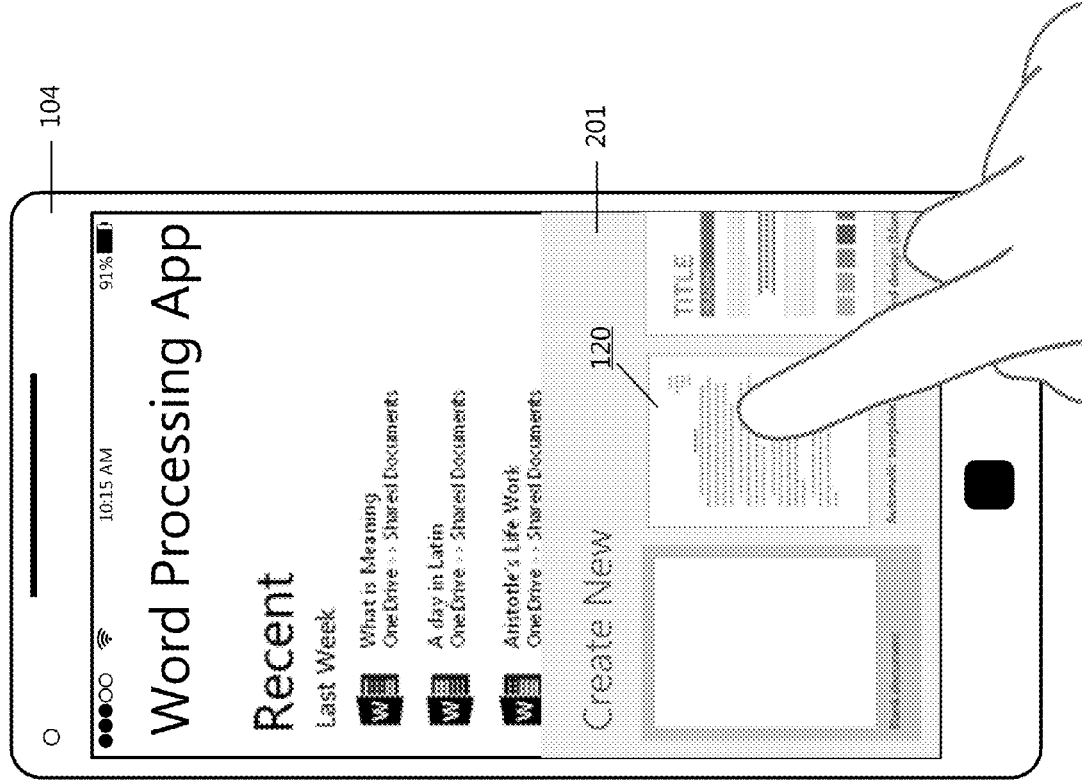
FIG. 4B is an illustration showing a user interface for displaying an automatically generated document template on another example computing device.

The example flow of data 200 continues to 212, where the automated template generation system 110 provides generated document templates 120 to the user 102. For example, the application 106 generates a user interface (UI) 201 for displaying automatically generated document templates 120, in addition to any other pre-existing templates to the user 102. According to an example, when a user 102 opens an application 106 on a computing device 104, the automatically generated document templates 120, in addition to any other pre-existing templates, are exposed to the application 106, for example, via an application programming interface (API) call. Example UIs 201 displayed on example computing devices 104 are illustrated in FIGS. 4A and 4B. In some examples, an image of one or more documents 108 of the plurality of documents 108 from which the subset of composition elements selected to be included in the automatically generated document template 120 may also be displayed to the user.

With reference again to FIG. 2, the example flow of data 200 continues to 214, where the user 102 selects the automatically generated document template 120 from the UI 201. For example, the selection of the automatically generated document template 120 may be received via mouse selection, keystroke entry, touch screen entry, voice or other audio entry, gesture entry, etc.

The example flow of data 200 continues to 216, where a new document 108 is created based on the composition elements included in the selected automatically generated document template 120. For example, when a user 102 creates a new document 108, the application 106 bases the new document 108 on a template 120. If the user 102 does not specify a particular template 120 when creating a new document 108, or if the user 102 uses a blank document template, the new document 108 is based on a default template including default settings such as font, font size, content of a file, etc. Upon selection of an automatically generated document template 120, the document 108 inherits the composition elements that exist in the selected template 120. As described above, by providing an automatically generated user-relevant document template 120, the user 102 is enabled to save time and steps in creating documents 108 from scratch or in reworking existing documents 108, thus reducing the amount of user input and the computing device 104 processing power needed to process the user input. Additionally, consistency across documents 108 created by the user 102 is ensured.

According to an aspect, when a document template 120 is selected and is used for creating a new document 108, the user 102 may modify some of the composition elements of the template. For example, the user 102 may modify content, content formatting, or document level formatting. Accordingly, in some examples, the modifications of the composition elements may be indexed and analyzed. When a trend is identified, such as when the user 102 makes the same modifications to composition elements of a given template 120, the automated template generation system 110 is operative to modify the template 120 or generate a new template 120 based on the identified trend.

Continuing with the example described above of the papers (i.e., documents 108) created by the student Alex (i.e., user 102), a document template 120 may be automatically created for Alex based on an identified subset of composition elements consistent across a plurality of documents 108 created by Alex. The automatically generated document template 120 is displayed to Alex (i.e., the user 102) in a UI 201, such as the example UIs illustrated in FIGS. 4A and 4B. Upon selection of the automatically generated document template 120, a new document 108 is created, wherein the new document 108 inherits the composition elements existing in the selected automatically generated document template 120.

Figure 5:
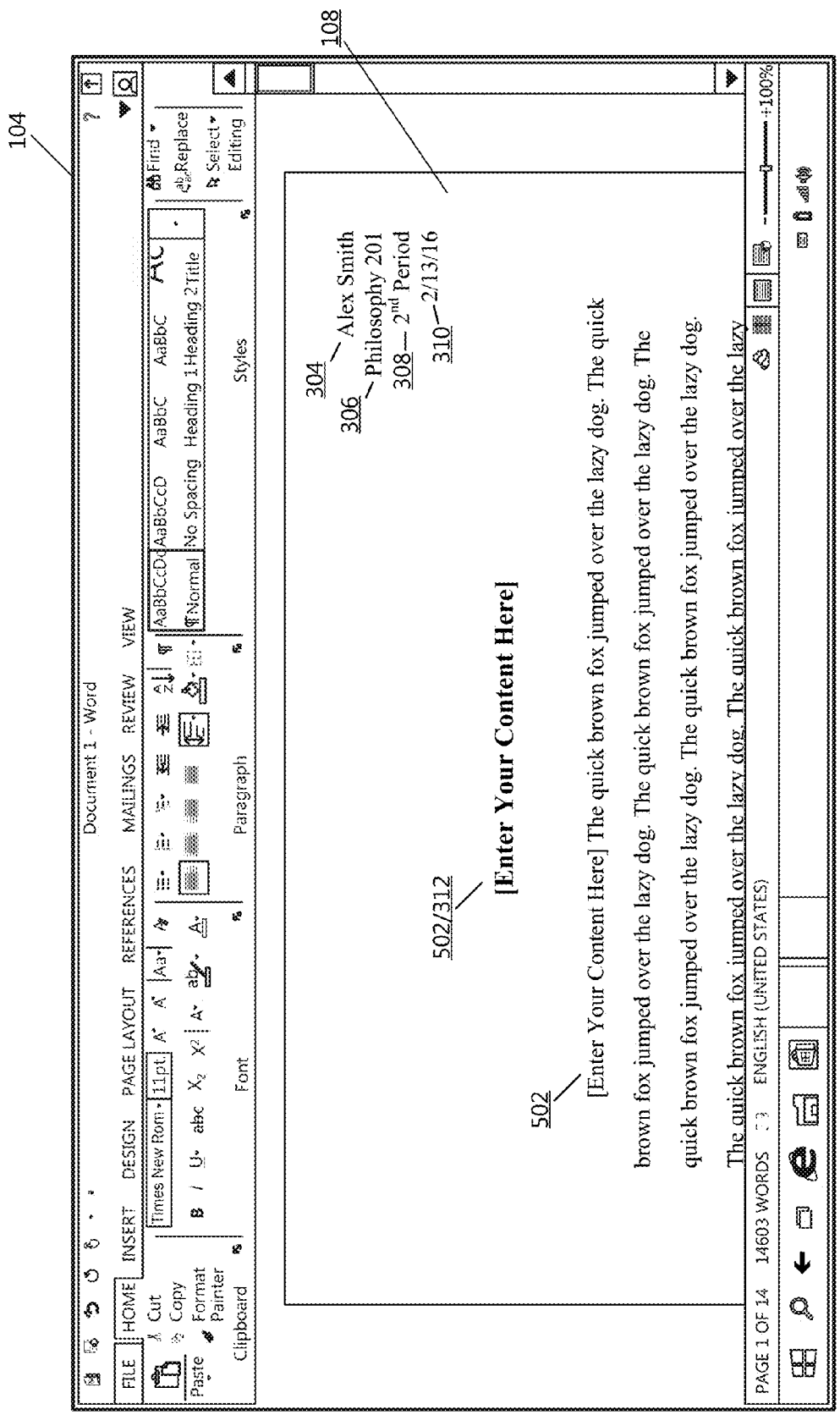
FIG. 5 is an illustration showing an example document created based on an automatically generated document template.

With reference to FIG. 5, an example of a new document 108 comprising various composition elements existing in an automatically generated document template 120 for Alex based on the identified subset of composition elements consistent across a plurality of documents 108 created by Alex is illustrated. Examples of a subset of composition elements inherited by the new document 108 include various pieces of content, such as the text "Alex Smith" (i.e., name 304) on the first line the document 108, the text "Philosophy 201" (i.e., class 306) on the second line of the document 108, and text "$3^{rd}$ Period" (i.e., class period 308) on the third line of the document 108. The example subset of composition elements identified by the automated template generation system 110 further includes a <date> tag (i.e., date 310) on the fourth line of the document 108, and various placeholders 502, such as a placeholder for the title heading 312 and a placeholder 502 for a portion of textual content in the body of the document 108. For example, when the automated template generation system 110 identifies matching formatting elements, but varying content associated with a data element, the automated template generation system 110 is operative to insert a placeholder 502 that includes the identified matching formatting properties and an input area into which the user is enabled to input different content. For example, the placeholder 502 for the title heading 312 includes the formatting properties (e.g., centered, bold, 12 pt font) of the title headings 312a,b,c of the documents 108a, b,c illustrated in FIG. 3. Other example placeholders 502 may include a picture placeholder, a table placeholder, a graph placeholder, and the like. The example subset of composition elements identified by the automated template generation system 110 and included in the example document 108 based on the automatically generated document template 120 further includes other formatting properties, such as alignment, spacing, margins, indentions, page numbering, etc. As should be appreciated, the examples illustrated with respect to FIGS. 3-5 and described above are exemplary, and are not limiting of the aspects and examples of the automated template generation system 110.

Figure 6:
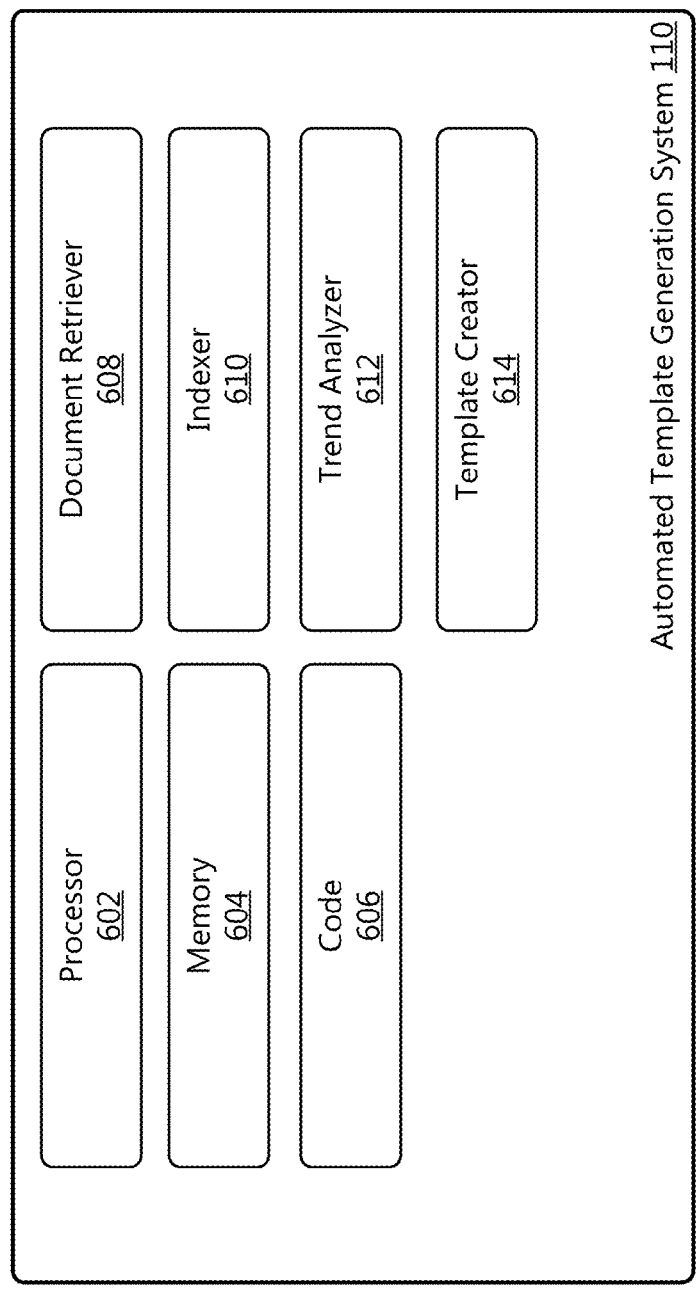
FIG. 6 is a block diagram illustrating components of an example automated template generation system.

With reference now to FIG. 6, a block diagram of various components of an example automated template generation system 110 is illustrated. According to examples, the automated template generation system 110 includes at least one processor 602 and memory 604 storing code 606, which is executable by the processor 602 to cause a document retriever 608 to retrieve documents 108 from the database 114, an indexer 610 to extract and index content and formatting elements extracted from the retrieved documents 108, a trend analyzer 612 to recognize trends and patterns of recurring composition elements amongst documents 108 associated with a user 102, and a template creator 614 to build a document template 120 using a recognized subset of composition elements, which can include content elements, formatting elements (e.g., including document level formatting elements), or a combination of content elements and formatting elements.

The document retriever 608 is illustrative of a software module, system, or device operative to retrieve documents 108 from the database 114. As described above, the database 114 stores a corpus of documents 108. In some examples, the database 114 is located locally to the user (e.g., a database 114 or memory storage device managed by a computing device 104). In other examples, the database 114 is located on devices that are part of a local or enterprise network in communication with the computing device 104 (e.g., a database 114 or memory storage device managed by a different computing device 104 or a local or enterprise server, such as a document management system). In yet other examples, the database 114 is located in the cloud (e.g., a database 114 or memory storage device managed by a server 112).

In some examples, the document retriever 608 is operative to retrieve specific documents 108. In other examples, the document retriever 608 is operative to retrieve documents 108 stored in specific databases 114 or portions of databases 114. In some examples, the document retriever 608 is operative to retrieve documents 108 from a hard drive, folder, or file local to the computing device 104 or connected to the network 140 as the database 114. The document retriever 608 may retrieve batches of documents 108, or may retrieve a single document 108.

The indexer 610 is illustrative of a software module, system, or device operative to intelligently scan the documents 108 retrieved by the document retriever 608, discover and extract composition elements (e.g., content, content formatting elements, and document level formatting elements) from the documents 108, and index the composition elements in an index 118.

The trend analyzer 612 is illustrative of a software module, system, or device operative to analyze the index 118 for making comparisons, identifying trends and patterns of recurring composition elements amongst documents 108 associated with a user 102, and determining meaningful subsets of composition elements for building a document template 120 that is relevant and useful to the user 102. For example, the trend analyzer 612 is operative to identify recurring inclusion of specific content (e.g., textual content, an understood string type, images, tables, graphs) in a plurality of documents 108, recurring use of specific formatting properties, including content formatting and document-level formatting (e.g., alignment, spacing, margins, indentions, page numbering, headers, footers, columns, typeface, font size) in a plurality of documents 108, and combinations of content and formatting properties.

The template creator 614 is illustrative of a software module, system, or device operative to build a document template 120 from a meaningful subset of composition elements identified by the trend analyzer 612. When a plurality of subsets is identified, the template creator 614 is operative to build multiple document templates 120. In some examples, the template creator 614 builds templates 120 using XML tags to give the content or formatting elements in the recognized set of matching composition elements various structural and relationship meanings according to a schema.

Figure 7:
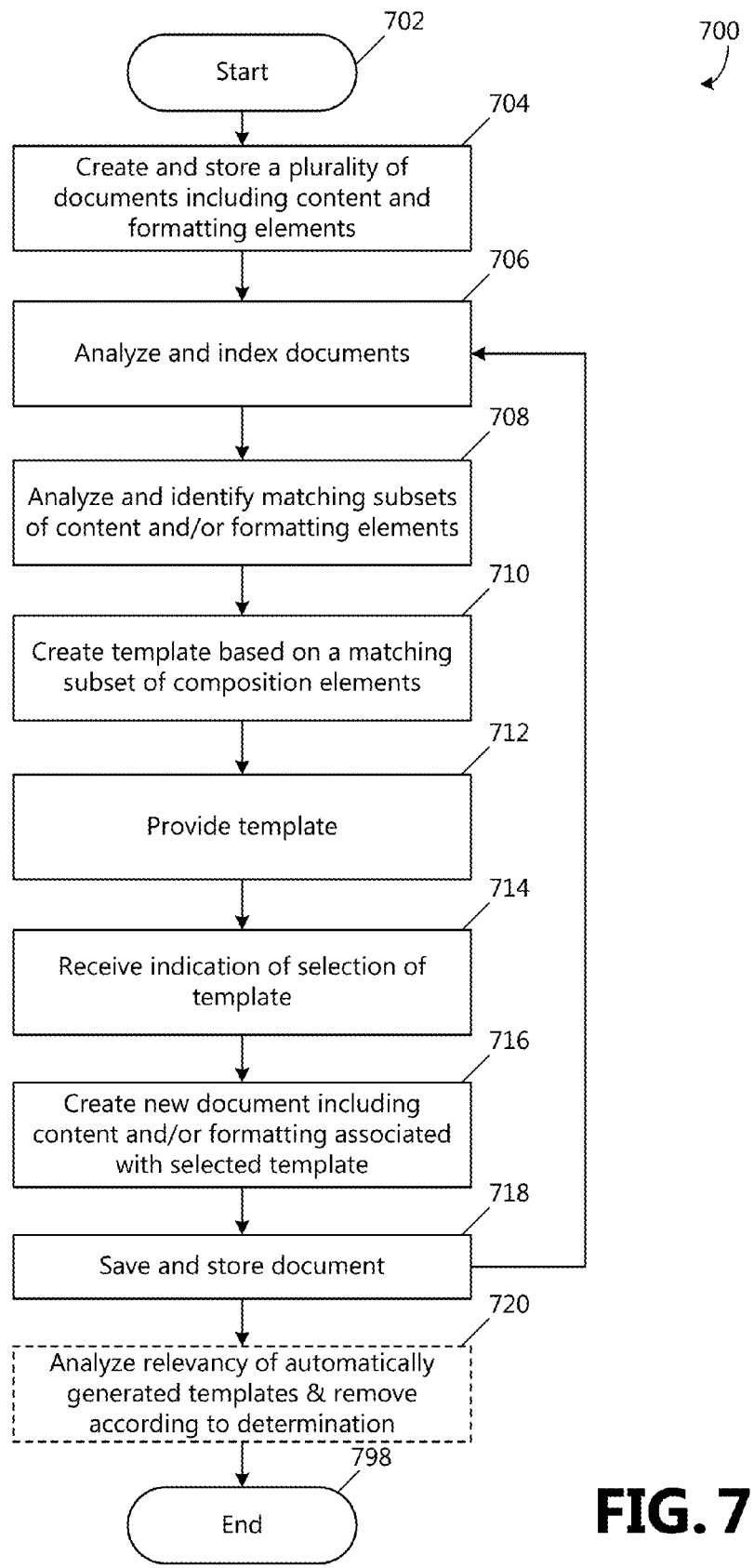
FIG. 7 is a flow chart showing general stages involved in an example method for automated document template generation based on recognized recurring composition elements.

FIG. 7 is a flow chart showing general stages involved in an example method 700 for automated document template generation based on recognized recurring composition elements. With reference now to FIG. 7, the method 700 begins at start OPERATION 702, and proceeds to OPERATION 704, where a user 102 of a computing device 104 uses an application 106 for creating a plurality of documents 108 and storing the documents 108 in a database 114. The plurality of documents 108 includes various pieces of content and various formatting elements. The creation of each of the plurality of documents 108 may occur at different times over a period of time. Documents 108 may include word processing documents, spreadsheets, slide presentation documents, email documents, note-taking documents, and the like.

The method 700 proceeds to OPERATION 706, where the document retriever 608 retrieves documents 108 from the database 114, and the indexer 610 indexes content and formatting elements of the documents 108 in an index 118. In some examples, the indexer 610 reads markup language tags, such as Extensible Markup Language (XML) tags to distinguish a position or a level (e.g., heading, header, body, footer, footnote, endnote) associated with content and formatting within the document 108 for indexing the content and formatting elements.

The method 700 proceeds to OPERATION 708, where the trend analyzer 612 analyzes the index 118, and identifies matching composition elements between documents 108. The trend analyzer 612 further determines meaningful subsets of composition elements (e.g., content elements, formatting elements) for building a document template 120 that is relevant and useful to the user 102.

The method 700 proceeds to OPERATION 710, where the template creator 614 builds a document template 120 from a meaningful subset of composition elements identified by the trend analyzer 612.

At OPERATION 712, one or more documents templates 120 or representations of one or more document templates 120 are displayed in a UI 201 on a computing device 104. According to an example, when the user 102 opens the application 106 on a computing device 104 to create a new document 108, the application 106 makes a request to the automated template generation system 110 for available templates 120. In response, the automated template generation system 110 provides the available templates 120 or a subset of available templates, including automatically generated user-relevant templates 120, to the application 106 for display in the UI 201. In some examples, the automated template generation system 110 provides representations (e.g., thumbnail or preview images) of the available templates 120 or of a subset of the available templates. According to an aspect, the same templates 120 are available on all of the computing devices 104 the user 102 uses, for example, on mobile devices such as a phone or tablet, or on desktop, laptop, or other types of computing devices used by the user 102.

The method 700 proceeds to OPERATION 714, where an indication of a selection of an automatically generated template 120 is received. For example, the user 102 may use one of various input means (e.g., mouse selection, keystroke entry, touch screen entry, voice or other audio entry, gesture entry) for selecting a desired automatically generated template 120.

At OPERATION 716, a new document 108 is created based on the composition elements included in the selected automatically generated document template 120. That is, the document 108 inherits the composition elements that exist in the selected template 120. In some examples, the application 106 may make a call to the automated template generation system 110 for the selected automatically generated document template 120 if it were not already received (e.g., if a preview image was sent at OPERATION 712). The user 102 is enabled to start on new documents 108 virtually anywhere, without having to worry about setting up formatting details. For example and with reference back to the example of Alex, when his teacher assigns a next paper, Alex (i.e., user 102) does not have to dig up his course syllabus to find the required formatting requirements; the formatting properties he previously used are automatically provided to him, thus saving time and providing Alex with a better user experience.

At OPERATION 716, the user 102 may add additional content to the document 108. In some examples, if the automatically generated document template 120 includes one or more placeholders 502, the user 102 may input content, and the formatting properties associated with the placeholders 502 are applied to the added content.

The method 700 continues to OPERATION 718, where the document 108 is saved and stored in the database 114. The method 700 may return to OPERATION 706, where the new document 108 is analyzed and indexed. For example, the user 102 may make changes to one or more composition elements of the template 120, such as changes to content, content formatting, or document level formatting. Accordingly, the modifications of the composition elements may be indexed and analyzed. In some examples, when a trend is identified, such as when the user 102 makes the same modifications to composition elements of a given template 120, the automated template generation system 110 is operative to modify the template or generate a new template based on the identified trend.

At OPTIONAL OPERATION 720, the automated template generation system 110 analyzes the relevance of automatically generated templates 120. For example, the automated template generation system 110 For example, the automated template generation system 110 may determine and associate a relevancy score with automatically generated document template 120, such that when a call is made to the automated template generation system 110 for templates 120 available to a given user 102, the most relevant document templates 120 are provided for display in the UI 201. The method 700 ends at OPERATION 798.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
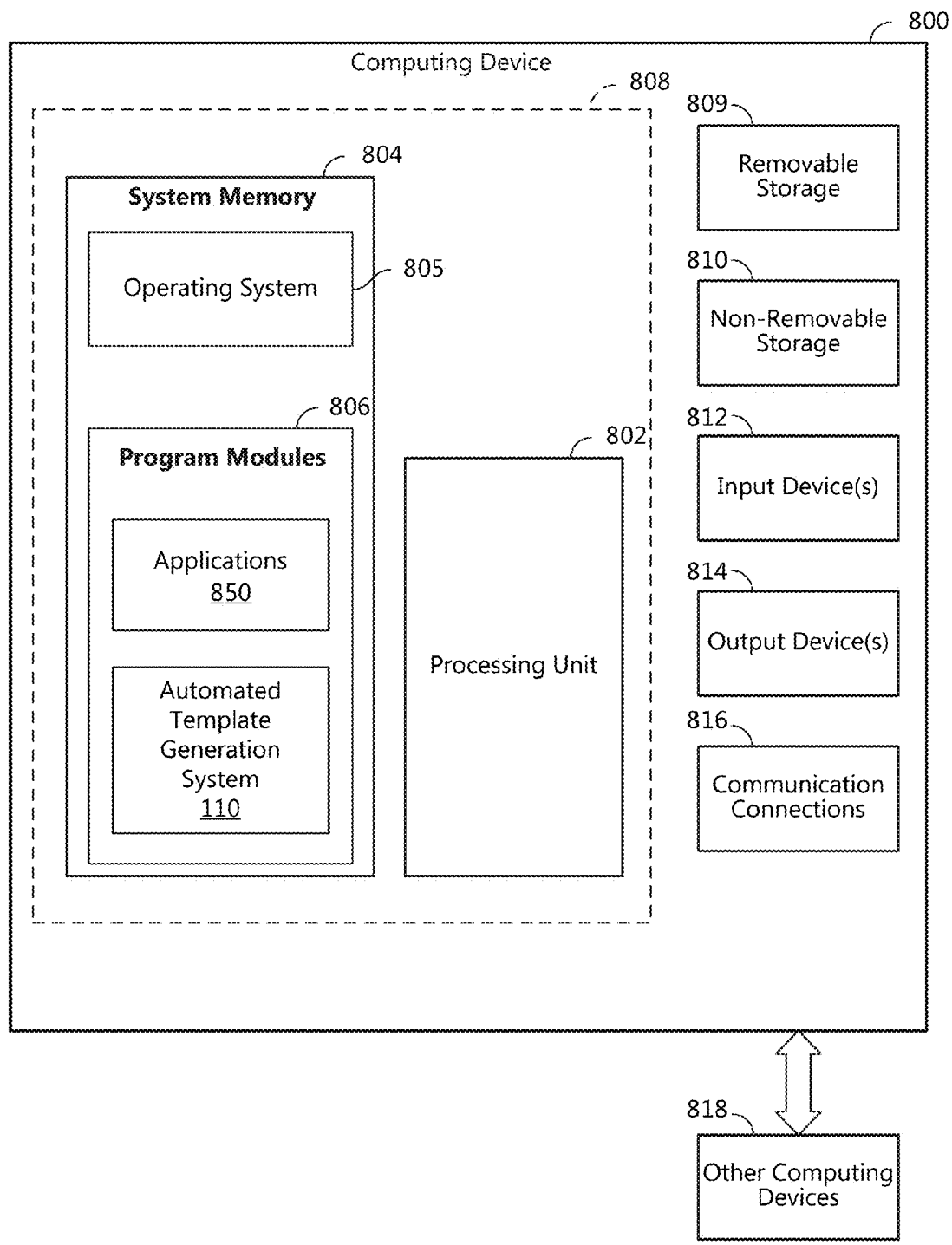
FIG. 8 is a block diagram illustrating example physical components of a computing device.
Figure 9A:
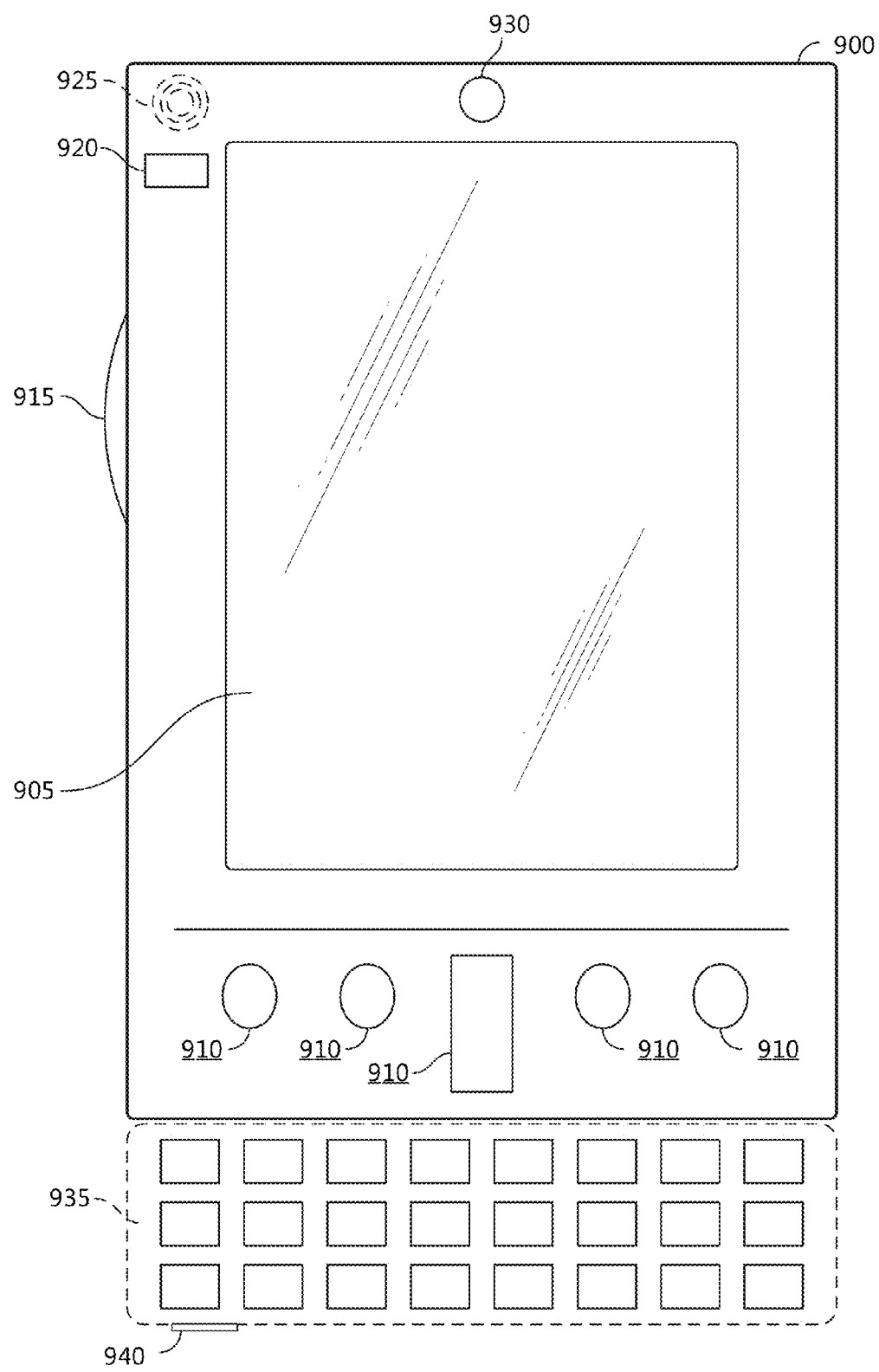
FIGS. 9A and 9B are block diagrams of a mobile computing device.
Figure 9B:
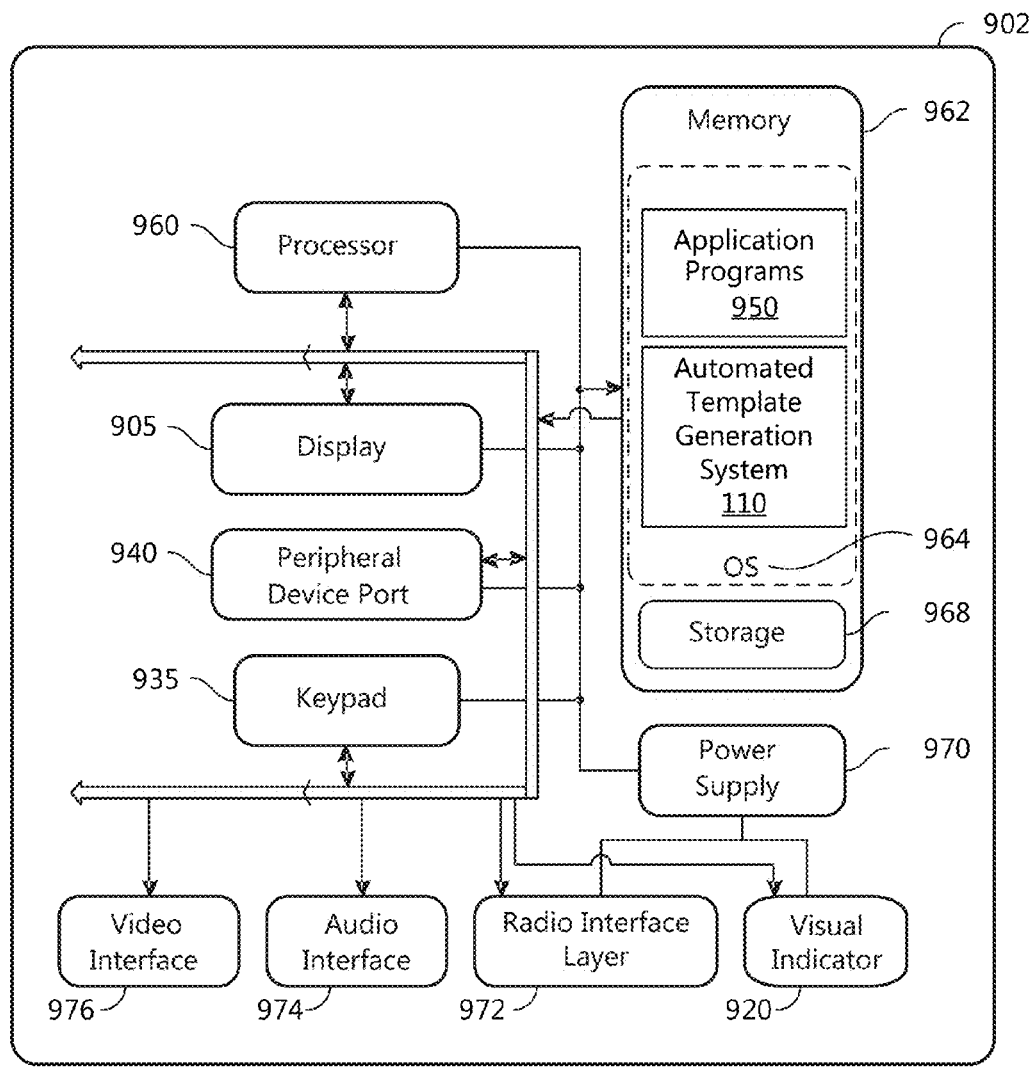
Figure 10:
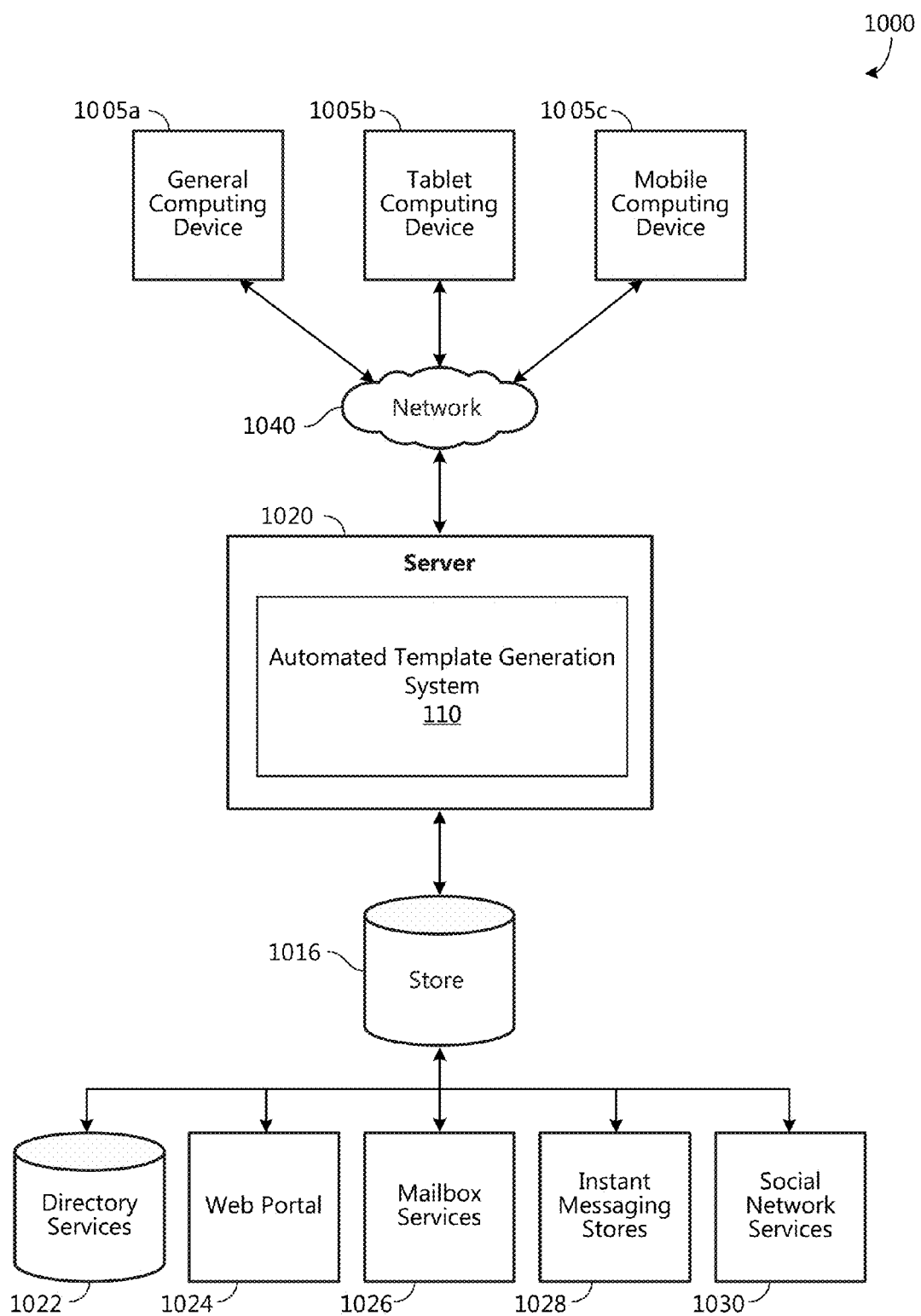
FIG. 10 is a block diagram of a distributed computing system.

FIGS. 8-10 and the associated descriptions provide a discussion of a variety of operating environments in which examples are practiced. However, the devices and systems illustrated and discussed with respect to FIGS. 8-10 are for purposes of example and illustration and are not limiting of a vast number of computing device configurations that are utilized for practicing aspects, described herein.

FIG. 8 is a block diagram illustrating physical components (i.e., hardware) of a computing device 800 with which examples of the present disclosure are be practiced. In a basic configuration, the computing device 800 includes at least one processing unit 802 and a system memory 804. According to an aspect, depending on the configuration and type of computing device, the system memory 804 comprises, but is not limited to, volatile storage (e.g., random access memory), non-volatile storage (e.g., read-only memory), flash memory, or any combination of such memories. According to an aspect, the system memory 804 includes an operating system 805 and one or more program modules 806 suitable for running software applications 850. According to an aspect, the system memory 804 includes the automated template generation system 110. The operating system 805, for example, is suitable for controlling the operation of the computing device 800. Furthermore, aspects are practiced in conjunction with a graphics library, other operating systems, or any other application program, and are not limited to any particular application or system. This basic configuration is illustrated in FIG. 8 by those components within a dashed line 808. According to an aspect, the computing device 800 has additional features or functionality. For example, according to an aspect, the computing device 800 includes additional data storage devices (removable and/or non-removable) such as, for example, magnetic disks, optical disks, or tape. Such additional storage is illustrated in FIG. 8 by a removable storage device 809 and a non-removable storage device 810.

As stated above, according to an aspect, a number of program modules and data files are stored in the system memory 804. While executing on the processing unit 802, the program modules 806 (e.g., automated template generation system 110) perform processes including, but not limited to, one or more of the stages of the method 700 illustrated in FIG. 7. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 8 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 800 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 800 has one or more input device(s) 812 such as a keyboard, a mouse, a pen, a sound input device, a touch input device, etc. The output device(s) 814 such as a display, speakers, a printer, etc. are also included according to an aspect. The aforementioned devices are examples and others may be used. According to an aspect, the computing device 800 includes one or more communication connections 816 allowing communications with other computing devices 818. Examples of suitable communication connections 816 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. According to an aspect, any such computer storage media is part of the computing device 800. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 9A and 9B illustrate a mobile computing device 900, for example, a mobile telephone, a smart phone, a tablet personal computer, a laptop computer, and the like, with which aspects may be practiced. With reference to FIG. 9A, an example of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. According to an aspect, the display 905 of the mobile computing device 900 functions as an input device (e.g., a touch screen display). If included, an optional side input element 915 allows further user input. According to an aspect, the side input element 915 is a rotary switch, a button, or any other type of manual input element. In alternative examples, mobile computing device 900 incorporates more or less input elements. For example, the display 905 may not be a touch screen in some examples. In alternative examples, the mobile computing device 900 is a portable phone system, such as a cellular phone. According to an aspect, the mobile computing device 900 includes an optional keypad 935. According to an aspect, the optional keypad 935 is a physical keypad. According to another aspect, the optional keypad 935 is a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some examples, the mobile computing device 900 incorporates a vibration transducer for providing the user with tactile feedback. In yet another example, the mobile computing device 900 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 900 incorporates peripheral device port 940, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one example of a mobile computing device. That is, the mobile computing device 900 incorporates a system (i.e., an architecture) 902 to implement some examples. In one example, the system 902 is implemented as a "smart phone"

capable of running one or more applications (e.g., browser, e-mail, calendaring, contact managers, messaging clients, games, and media clients/players). In some examples, the system 902 is integrated as a computing device, such as an integrated personal digital assistant (PDA) and wireless phone.

According to an aspect, one or more application programs 950 are loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. According to an aspect, the automated template generation system 110 is loaded into memory 962. The system 902 also includes a non-volatile storage area 968 within the memory 962. The non-volatile storage area 968 is used to store persistent information that should not be lost if the system 902 is powered down. The application programs 950 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900.

According to an aspect, the system 902 has a power supply 970, which is implemented as one or more batteries. According to an aspect, the power supply 970 further includes an external power source, such as an AC adapter or a powered docking cradle that supplements or recharges the batteries.

According to an aspect, the system 902 includes a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 950 via the operating system 964, and vice versa.

According to an aspect, the visual indicator 920 is used to provide visual notifications and/or an audio interface 974 is used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. According to an aspect, the system 902 further includes a video interface 976 that enables an operation of an on-board camera 930 to record still images, video stream, and the like.

According to an aspect, a mobile computing device 900 implementing the system 902 has additional features or functionality. For example, the mobile computing device 900 includes additional data storage devices (removable and/or non-removable) such as, magnetic disks, optical disks, or tape. Such additional storage is illustrated in FIG. 9B by the non-volatile storage area 968.

According to an aspect, data/information generated or captured by the mobile computing device 900 and stored via the system 902 is stored locally on the mobile computing device 900, as described above. According to another aspect, the data is stored on any number of storage media that is accessible by the device via the radio 972 or via a wired connection between the mobile computing device 900 and a separate computing device associated with the mobile computing device 900, for example, a server computer in a distributed computing network, such as the Internet. As should be appreciated such data/information is accessible via the mobile computing device 900 via the radio 972 or via a distributed computing network. Similarly, according to an aspect, such data/information is readily transferred between computing devices for storage and use according to well-known data/information transfer and storage means, including electronic mail and collaborative data/information sharing systems.

FIG. 10 illustrates one example of the architecture of a system 1000 for providing generation of a document template 120 based on recognized composition element patterns in documents 108 associated with a user 102 as described above. Content developed, interacted with, or edited in association with the automated template generation system 110 is enabled to be stored in different communication channels or other storage types. For example, various documents may be stored using a directory service 1022, a web portal 1024, a mailbox service 1026, an instant messaging store 1028, or a social networking site 1030. The automated template generation system 110 is operative to use any of these types of systems or the like for providing automatically generated user-relevant document templates 120, as described herein. According to an aspect, a server 1020 provides the automated template generation system 110 to clients 1005a,b,c. As one example, the server 1020 is a web server providing the automated template generation system 110 over the web. The server 1020 provides the automated template generation system 110 over the web to clients 1005 through a network 1040. By way of example, the client computing device is implemented and embodied in a personal computer 1005a, a tablet computing device 1005b or a mobile computing device 1005c (e.g., a smart phone), or other computing device. Any of these examples of the client computing device are operative to obtain content from the store 1016.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for improving efficiency in a computer device providing a document template relevant to a user, comprising:
   retrieving a plurality of documents associated with a particular user and stored in a database to index composition elements;
   indexing composition elements of the plurality of documents associated with the particular user;
   analyzing the index to identify trends of composition elements in documents associated with the particular user;
   when a trend of a subset of composition elements in a plurality of documents associated with the particular user is identified, creating a document template including the subset of composition elements;
   providing the document template for display in a user interface; and
   in response to receiving a selection from the user interface, creating a new document based on a copy of the document template for receiving user input.

2. The computer-implemented method of claim 1, further comprising:
   receiving an indication of a selection of the document template; and
   creating a new document based on the selected document template, wherein the new document inherits the subset of composition elements.

3. The computer-implemented method of claim 2, further comprising:
   storing the new document in a database to index composition elements;
   indexing composition elements of the new document;
   analyzing the index to identify trends of changes to composition elements in documents created from a given document template;
   when a trend of changes to a subset of composition elements in a plurality of documents created from the given document template is identified, modifying the given document template according to the identified trend of changes to the subset of composition elements; and
   providing the modified document template for display in the user interface.

4. The computer-implemented method of claim 1, wherein indexing composition elements of the plurality of documents comprises indexing content and formatting elements.

5. The computer-implemented method of claim 4, wherein analyzing the index to identify trends of composition elements in documents associated with the user comprises analyzing the index to identify at least one of:
   matching subsets of content;
   matching subsets of content formatting elements; and
   matching subsets of document level formatting elements.

6. The computer-implemented method of claim 1, wherein analyzing the index to identify trends of composition elements in documents associated with the user comprises analyzing the index to identify a subset of matching formatting elements with varying content.

7. The computer-implemented method of claim 6, wherein creating a document template including the subset of composition elements comprises creating a document template comprising a placeholder, wherein the placeholder includes the identified matching content or document level formatting elements and an input area into which the user is enabled to input content.

8. The computer-implemented method of claim 7, wherein retrieving a plurality of documents stored in a database comprises:
   discovering connections between the user and colleagues of the user;
   locating files, folders, and drives of colleagues of the user for retrieving the plurality of documents; and
   retrieving the plurality of documents.

9. The computer-implemented method of claim 1, wherein analyzing the index to identify trends of composition elements in documents associated with the user comprises analyzing the index to identify trends of composition elements in documents authored by the user or colleagues of the user.

10. A system for improving efficiency in a computer device providing a document template relevant to a user, comprising:
    a processor; and
    a memory, including instructions, which when executed by the processor are operable to provide an automated template generation system, the automated template generation system comprising:
    a document retriever operative to retrieve a plurality of documents associated with a particular user and stored in a database;
    an indexer operative to index composition elements of the retrieved plurality of documents associated with the particular user, wherein the composition elements include content and formatting elements;
    a trend analyzer operative to analyze the index to identify trends of content and formatting elements in documents associated with the particular user;
    a template creator operative to create a document template relevant to the user when a trend of a subset of composition elements in a plurality of documents associated with a user is identified, wherein the document template includes the subset of composition elements and wherein a new document is created by copying the document template.

11. The system of claim 10, wherein the automated template generation system is further operative to:
    receive an indication of a selection of the document template; and
    create a new document based on the selected document template, wherein the new document inherits the subset of composition elements.

12. The system of claim 11, wherein in creating a document template including the subset of composition elements, the template creator is operative to create a document template comprising a placeholder, wherein the placeholder includes the identified matching formatting elements and an input area into which the user is enabled to input content.

13. The system of claim 10, wherein in analyzing the index to identify trends of composition elements in documents associated with the user, the trend analyzer is further operative to analyze the index to identify at least one of:
- matching subsets of content;
- matching subsets of content formatting elements; and
- matching subsets of document level formatting elements.

14. The system of claim 10, wherein in analyzing the index to identify trends of composition elements in documents associated with the user, the trend analyzer is operative to analyze the index to identify a subset of matching content or document level formatting elements with varying content.

15. The system of claim 10, wherein in retrieving a plurality of documents stored in a database, the document retriever is operative to:
- identify connections between the user and colleagues of the user;
- locate files, folders, and drives of colleagues of the user for retrieving the plurality of documents; and
- retrieve the plurality of documents.

16. A computer readable storage device including instructions, which when executed by a processor are operable to perform the steps comprising:
- retrieving a plurality of documents associated with a particular user stored in a database to index composition elements;
- indexing composition elements of the plurality of documents associated with the particular user, wherein the composition elements include content and formatting elements;
- analyzing the index to identify trends of composition elements in documents associated with the particular user;
- when a trend of a subset of composition elements in a plurality of documents associated with the particular user is identified, creating a document template including the subset of content and formatting elements;
- providing the document template for display in a user interface; and
- in response to receiving a selection from the user interface, creating a new document based on a copy of the document template for receiving user input.

17. The computer readable storage device of claim 16, further comprising:
- receiving an indication of a selection of the document template; and
- creating a new document based on the selected document template, wherein the new document inherits the subset of composition elements.

18. The computer readable storage device of claim 16, wherein analyzing the index to identify trends of composition elements in documents associated with the user comprises analyzing the index to identify at least one of:
- matching subsets of content;
- matching subsets of content formatting elements; and
- matching subsets of document level formatting elements.

19. The computer readable storage device of claim 16, wherein:
- analyzing the index to identify trends of composition elements in documents associated with the user comprises analyzing the index to identify a subset of matching content or document level formatting elements with varying content; and
- creating a document template including the subset of composition elements comprises creating a document template comprising a placeholder, wherein the placeholder includes the identified matching content or document level formatting elements and an input area into which the user is enabled to input content.

20. The computer readable storage device of claim 16, wherein:
- analyzing the index to identify trends of composition elements in documents associated with the user comprises analyzing the index to identify trends of composition elements in documents authored by colleagues of the user; and
- retrieving a plurality of documents stored in a database comprises:
- discovering connections between the user and colleagues of the user;
- locating files, folders, and drives of colleagues of the user for retrieving the plurality of documents; and
- retrieving the plurality of documents.

* * * * *